March 16, 1926.  
F. A. STEVENS ET AL  
1,576,869  
OPHTHALMIC MOUNTING  
Original Filed June 13, 1921
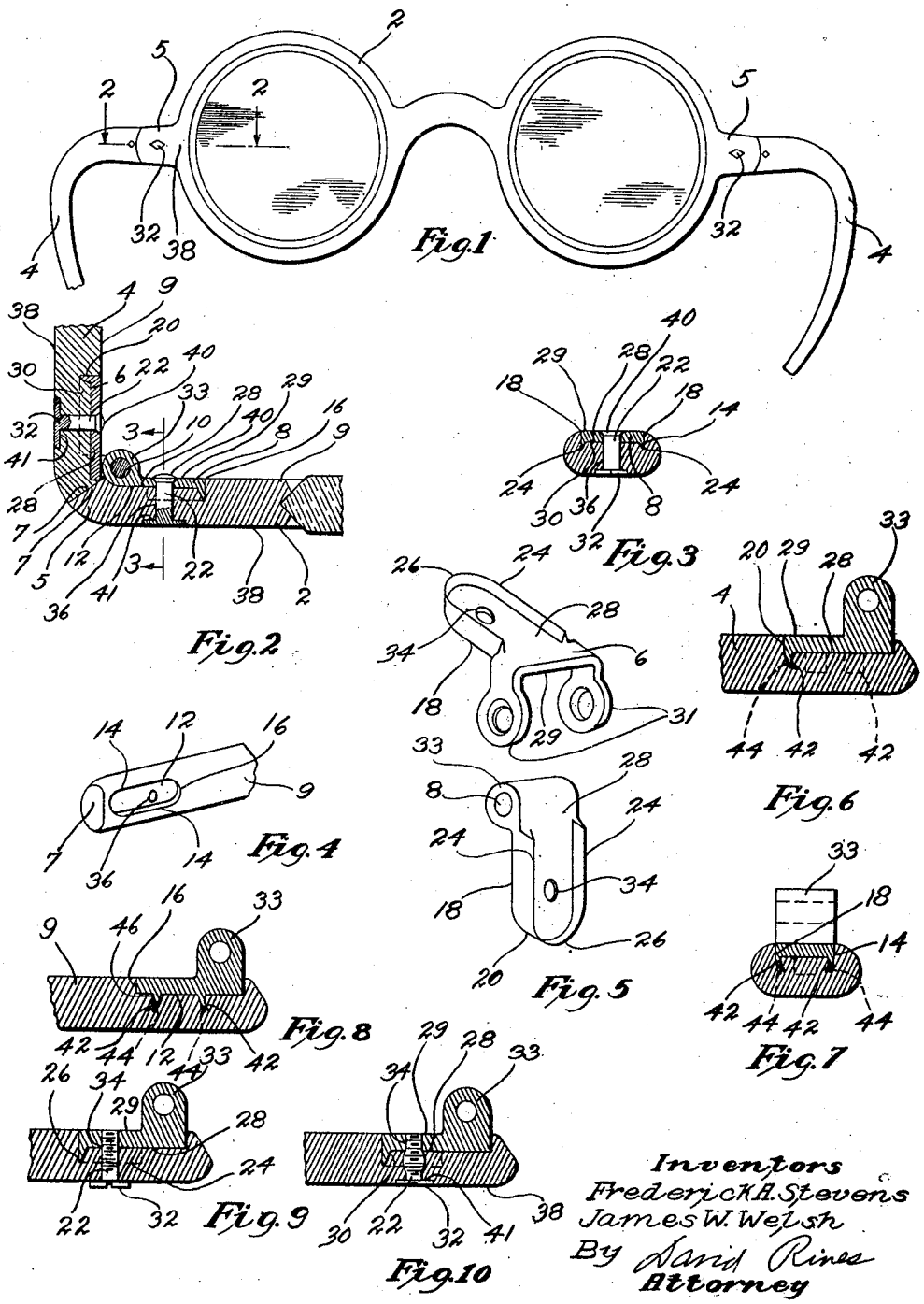
Inventors  
Frederick A. Stevens  
James W. Welsh  
By David Rines  
Attorney Patented Mar. 16, 1926.

1,576,869

UNITED STATES PATENT OFFICE.

FREDERICK A. STEVENS AND JAMES W. WELSH, OF PROVIDENCE, RHODE ISLAND, ASSIGNORS TO BAUSCH AND LOMB OPTICAL COMPANY, OF ROCHESTER, NEW YORK, A CORPORATION OF NEW YORK.

OPHTHALMIC MOUNTING.

Original application filed June 13, 1921, Serial No. 477,146. Divided and this application filed October 16, 1924. Serial No. 743,956.

*To all whom it may concern:*

Be it known that we, FREDERICK A. STEVENS and JAMES W. WELSH, citizens of the United States, and residents of Providence, in the county of Providence and State of Rhode Island, have jointly invented new and useful Improvements in Ophthalmic Mountings, of which the following is a specification.

The present invention relates to articles of manufacture comprising members constituted of plastic material to which are secured metal members, and it has more particular application to ophthalmic mountings comprising non-metal members that are connected together by metal hinges. The present application is a division of a copending application, Serial No. 447,146, filed June 13, 1921.

In commercial ophthalmic mountings of the above-described character, the hinge plates have hitherto been secured to the non-metal members by pairs of rivets passing through the hinge plates and the members. These have not been fully satisfactory. It has been proposed to mount beveled hinge plates in previously prepared, dovetailed grooves of the non-metal members, and to hold them in place by cement or by single screws. There is a tendency, however, for the beveled walls of the hinge plates to twist or turn in their grooves, causing them to bite into the dovetailed-groove walls and weakening the brittle, non-metal material; the non-metal material, furthermore, will shrink, in time, causing enlargement of the grooves; so that ultimately the hinge plates would become so loosened as to impair the utility of the mounting.

A chief object of the present invention is to improve upon ophthalmic mountings of the above-described character, to the end that a better joint may be provided between the metal and the non-metal parts, and the serviceableness and the utility of the mounting as a whole enhanced.

To the attainment of the above-named end, a feature of the invention resides in tightly fitting a metal plate, that is previously provided with beveled, suitably projecting wings, securely into a suitably shaped recess of the non-metal member, and pressing it into the recess so as to cause the beveled wings to bite or wedge into, and become embedded within, the non-metal material. As the non-metal material is usually a plastic substance, like zylonite, the plastic mass becomes compressed in between the wings. The walls of the recess acting upon the walls of the metal plate upon one side, and the compressed plastic mass acting upon the inner sides of the wings upon the other, a very effective joint is produced, preventing twisting or turning of the metal. A single rivet or screw extending through the non-metal material and the metal plate is found to be sufficient to hold the parts together. The rivet or screw is shaped to prevent its turning, so that it can not become loose.

With the above and other objects in view, the invention consists more particularly of the improved ophthalmic mounting hereinafter described, illustrated in the accompanying drawings, and defined in the appended claims.

In the drawings, Fig. 1 is a front elevation of a pair of spectacles constructed according to a preferred embodiment of the present invention; Fig. 2 is a section, taken upon the line 2—2 of Fig. 1, looking in the direction of the arrows; Fig. 3 is a section taken upon the line 3—3 of Fig. 2, looking in the direction of the arrows; Fig. 4 is a view of the end of a spectacle temple provided with a hinge-plate-receiving recess; Fig. 5 is a view of preferred hinge plates adapted for use according to the present invention, shown detached for clearness; Fig. 6 is a section similar to Fig. 2 of a modification; Fig. 7 is a section similar to Fig. 3 of the modification shown in Fig. 6; Fig. 8 is a section similar to Fig. 6 of another modification; and Figs. 9 and 10 illustrate a preferred method of securing the retaining rivet or screw in place.

The invention is for illustrative purposes shown in connection with a spectacle mounting comprising a lens-holding frame or front 2 and temples or bows 4 constituted of plastic, non-metal material, like celluloid, zylonite or other composition. The term "zylonite" will, for brevity, be employed in the specification and the claims as generic to all such materials. The temples 4 are pivotally connected to the lens-holding frame 2 by hinges comprising one-piece hinge plates 6 and 8. Each hinge plate is provided with a base portion having oppositely disposed, substantially flat, inner and outer faces or sides 28 and 29. The hinge plate 6 is provided with two perforated ears or knuckles 31 integrally disposed laterally upon one side 29 of the hinge plate, out of the general plane of the base portion, nearer one end thereof than the other as illustrated. The hinge plate 8 is similarly provided with a perforated ear or knuckle 33, similarly disposed. The knuckle 33 is disposed between the knuckles 31 and the hinge plates are pivoted together by a pivot pin or pintle 10 that extends through the perforations in the knuckles.

One of the hinge plates, as the hinge plate 8, is mounted upon the rear face of a non-metal end piece 5 that extends integrally at one side of the frame 2, and the other is mounted upon the inner face of the end portion of the temple. The said end portion of the temple and the end piece 5 are beveled, as shown at 7, provided for a butt joint. When the temple is swung about the pintle 10 to its limit of pivotal movement, the beveled portions 7 will be caused to abut.

One face 9 of each of the non-metal members is recessed, the bottom wall of the recess 12 being substantially flat and the recess being shown provided with longitudinally extending walls 14 that may be straight and parallel, if desired, and that are connected by a transversely extending wall 16. There may be a wall opposed to the wall 16 or the recess may be open-ended, as desired. The hinge plates 6 and 8 are similarly substantially flat and are provided with oppositely disposed walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. A single rivet or screw 22, extending through the non-metal member and the hinge plate will be found sufficient to hold the hinge plates within their respective recesses.

It is commercially impossible to have the hinge plates fit in the recesses 12 always with exactly the right degree of tightness. A dull cutting tool, for example, will not cut exactly the same-sized recess 12 as when sharp. As non-metal material of the kind employed in ophthalmic mountings of the above-described character always shrinks, moreover, no matter how thoroughly it is cured, a recess that is of just the proper shape and size when made will become larger with the lapse of time. A hinge plate that is merely fitted into place within the recess, therefore, even though it fit properly in the beginning, will soon become undesirably loose, causing the temple to wabble.

This is prevented, according to the present invention, by providing the hinge plate with one or more anchoring or attachment members that project integrally from the sides or edges 18 of the hinge plates and that are caused to bite or wedge laterally into and become embedded within the non-metal material. One or more of the attachment members of one hinge plate are embedded in the end piece 5, and those of the other end piece in the temple. The hinge plates become thus securely mounted upon the non-metal members. The preferred construction is shown more particularly in Fig. 5, and comprises oppositely disposed beveled wings 24, preferably along the oppositely disposed walls 18, and a beveled wing 26, preferably along the wall 20, connecting the beveled wings 24. The beveled wings are of less cross-sectional dimensions than that of the base portions of the hinge plates, providing shoulders at their junction with the said base portions. The wings 24 and 26 are shown continuous and offset from the inner face or side 28 of the hinge plate, to form a continuous, beveled, offset flange. The hinge plate, after being fitted into position in the recess 12, is forced home flush in the recess by pressure, causing the beveled wings to bite or wedge into, and become embedded within, the non-metal material, as above described. The non-metal material being plastic, it becomes compressed or wedged into the channel 30, Fig. 3, between the wings, effecting a very tight joint. The compression of the material compensates for shrinkage. It will thus be apparent that the final recess is in part formed by removal of the stock and in part by compression.

Hinges mounted as above described will be firmly and securely and perfectly seated within their recesses, unable to turn or twist or otherwise become loose, and they can not be pulled laterally or longitudinally out of their seats. The hinge plate and the non-metal member upon which it is mounted become, in effect, one unitary member. As the beveled wings 24 and 26 dig their own way into the stock, a very effective joint may, in fact, be provided without previously recessing the non-metal material. The joint is, however, strengthened by the use of the previously formed recess, the walls 14 and 16 of which contact with the walls 18 and 20 of the hinge plate, and the recess makes it possible, furthermore, to sink the hinge plate flush with the face 9 of the non-metal member, as will be understood from Figs 2 and 5, improving the appearance of the mounting. The body of the hinge plate is seated flush in the recess, the wings holding it in place by being embedded or wedged in the plastic material.

As has been pointed out above, a single rivet 22 or its equivalent will suffice to hold the parts together, so that the necessity for weakening the non-metal material by multiple riveting is avoided. The rivet or other holding member, however, should not be permitted to turn, as it would then become loose and dislodged. It is accordingly provided with an irregular or non-round portion 32 that is sunk into the non-metal material. Unnecessary turning of the rivet or screw and premature wear are thus avoided. The irregular portion may conveniently be formed upon the head of the rivet, and as it will then become exposed to view, as will be clear from Fig. 2, it is desirable, for appearance sake, to have it assume some pleasing contour, such as the diamond of Fig. 1. The rivet thus combines within itself the properties both of utility and ornament. In practice, the rivet or screw 22 will be mounted in previously formed alined bores 34 and 36 of the hinge plate and the non-metal member, respectively. Its suitably shaped head may then be forced into the non-metal member, or into a previously formed, correspondingly irregularly shaped, recess 41, Fig. 2, flush with the face 38, and the opposite end of the rivet may finally be headed over against the hinge plate, as shown at 40. If a screw is employed, it may be screwed into the screw-threaded bore 34 of the hinge plate, and then upset by pressure applied to the opposite ends of the screw, as will be clear from Figs. 9 and 10. The head 32 will thus be forced into position, flush with the face 38 of the non-metal member, and the body of the screw will be caused to bulge out, Fig. 10, effecting a very tight union of the parts.

Though preferred, it is not essential that the wings 24 and 26 be continuous. They may be formed of separate spurs 42, as shown in Figs. 6 and 7. The positions originally occupied by the spurs are indicated in dotted lines at 44, but they bite oppositely obliquely inward, as shown in full lines, and become so embedded in the non-metal material when the hinge plate is forced into place by pressure. The spurs, if properly shaped, are caused to bend of their own accord when the hinge plate is pressed into position, naturally following the lines of least resistance. The spurs may be two only, or even one only, in number. Two spurs 46 only are shown in Fig. 8 at or near opposite ends of the hinge plate, bent obliquely oppositely away from each other, as illustrated, when the hinge plate is pressed into place. One of the spurs is nearer the ears or knuckles than the other. This construction forms the subject matter of a copending application Serial No. 31,751, filed May 21, 1925. With spurs positioned as in Figs. 6 to 8, inclusive, and with the spurs long enough, the rivets or screws 22 may be omitted, but it is better, in order to avoid unnecessary strain, to employ the rivets or their equivalents, as shown in the other figures.

Many other modifications within the spirit and scope of the invention will readily suggest themselves to persons skilled in the art. The above description is therefore intended to be illustrative and not restrictive, and it is desired that the appended claims be broadly construed, unlimited except in so far as limitations may be imposed by the prior art.

What is claimed is:—

1. In a knuckle hinge, a pair of cooperating one-piece hinge members, one of the members comprising a base portion having at one side integral laterally extending knuckles and the other member comprising a base portion having at one side a knuckle disposed between the laterally extending knuckles, each member being arranged with attachment means at the side of the base opposite to the said one side and of less cross sectional dimension than the base for imbedment in the material of its support, and the knuckles being perforated for the engagement of a pintle.

2. In a knuckle hinge, a pair of one-piece hinge members, each member comprising a base portion provided with an integral, laterally extending knuckle and arranged with attachment means at the side of the base opposite to the knuckle and of less cross sectional dimension than the base for imbedment in the material of its support, and the knuckles perforated for the engagement of a pintle.

3. In a knuckle hinge, a pair of hinge members, each hinge member comprising a base portion provided with a knuckle extending laterally thereof and attachment means extending from the base opposite to the knuckle for imbedment in the material of its support to mount the hinge member, said attachment means being of less width than the base to provide a shoulder at the juncture thereof with the base for the purpose specified.

4. In a knuckle hinge, a pair of one-piece hinge members, each hinge member comprising a base portion having a knuckle extending laterally thereof and an attachment member extending opposite to the knuckle, said base portion being of greater width than the attachment member to form a shoulder at the juncture of the attachment member with the base and the knuckles of the members adapted to inter-engage and arranged with perforations for the engagement of a pintle.

5. In hingedly connecting non-metallic bows and frames of spectacles, a pair of hinge members, each hinge member comprising a base portion arranged with integral, oppositely extending, attachment means and a knuckle, and said attachment means being adapted for imbedment laterally into the material of the bows and frame to mount the hinge members thereon.

6. A hinge member having a base portion provided with oppositely disposed substantially flat sides and walls connecting the sides, a flange extending from one of the sides adjacent to each of two oppositely disposed walls, and a hinge knuckle extending from the other side adjacent to a wall disposed between the said two oppositely disposed walls.

7. An ophthalmic mounting comprising two non-metal members, one a lens frame and the other a temple, and a hinge for connecting them together, the hinge comprising a metal member having a base portion provided with oppositely disposed substantially flat sides and walls connecting the sides, a flange extending from one of the sides adjacent to each of two oppositely disposed walls, and a hinge knuckle extending from the other side adjacent to a wall disposed between the said two oppositely disposed walls, one of the non-metal members having a recess in which the base portion and flanges are received.

8. An ophthalmic mounting comprising a non-metal member having a recess provided with a substantially flat bottom and walls, and a hinge member having a base portion provided with a substantially flat side in contact with the bottom and walls in contact with the recess walls, the flat side of the base portion being provided with an attachment member embedded in the non-metal material, and the opposite side of the base portion being provided with a hinge knuckle.

9. In hinges to hingedly connect the bows and rim of non-metallic spectacles, a pair of hinge members, each hinge member comprising a base portion arranged with an integral attachment member, one of the hinge members having knuckles extending laterally from the base portion, and the other hinge member having a knuckle extending laterally from the base portion and disposed between the first-named knuckles, said attachment members being adapted to be embedded in the material of the bows and rim, and means for insertion into the material of the bows and rim for engagement with the attachment members to secure the hinge members in the bows and rim.

10. A hinge member comprising a plate-shaped base portion having oppositely disposed substantially flat sides, the hinge member having an attachment member integrally extending from one of the substantially flat sides of the base portion and having a knuckle disposed on the other substantially flat side of the base portion, the attachment member being of less cross-sectional dimension than the base portion to form a shoulder at the junction of the attachment member and the base portion.

11. A hinge comprising two hinge members each comprising a base portion having oppositely disposed sides, one of the sides of each base portion being substantially flat, each hinge member having an attachment member integrally extending from the substantially flat side and having a knuckle disposed on the other side, the knuckles being pivoted together, and each attachment member being of less cross-sectional dimension than the base portion from which it extends to form a shoulder at the junction of the attachment member and the base portion.

12. An article of the class described comprising a non-metal member and a hinge member, the hinge member comprising a base portion having oppositely disposed sides, the hinge member having a knuckle disposed on one side of the base portion and means integrally extending from the other side of the base portion embedded in the non-metal member, and means extending into the non-metal member and the hinge member.

13. An article of the class described comprising a zylonite member provided with a substantially flat face, and hinge member comprising a plate-shaped base portion having oppositely disposed substantially flat sides, the hinge member having an attachment member integrally extending from one of the substantially flat sides of the base portion of less cross-sectional dimension than the base portion and having a knuckle disposed on the other substantialy flat side of the base portion, and the hinge member being mounted upon the zylonite member with the first-named substantially flat side in contact with the said face and with the attachment member embedded in the zylonite member.

14. An ophthalmic mounting comprising a zylonite member, and a hinge member comprising a plate-shaped base portion having oppositely disposed substantially flat sides, the hinge member having a knuckle disposed on one of the substantially flat sides of the base portion and means integrally extending from the other substantially flat side of the base portion embedded in the zylonite member.

15. An ophthalmic mounting comprising a zylonite member, and a hinge member comprising a plate-shaped base portion having oppositely disposed substantially flat sides, the hinge member having a knuckle disposed on one of the substantially flat sides of the base portion and an attachment member integrally extending from the other substantially flat side of the base portion embedded in the zylonite member, the attachment member being of less cross-sectional dimension than that of the base portion.

16. An ophthalmic mounting comprising a non-metal front provided with an integral extension at one side, a temple, and a hinge pivotally connecting the front and the temple, the hinge comprising a plate-shaped member having oppositely disposed substantially flat sides and having a knuckle disposed on one of the substantially flat sides and an attachment member integrally extending from the other substantially flat side and embedded in the extension, the temple being pivoted to the knuckle.

17. An ophthalmic mounting comprising a front, a temple, and a hinge pivotally connecting the front and the temple, the hinge comprising two hinge members each comprising a base portion having oppositely disposed sides, each hinge member having a knuckle disposed on one side of the base portion and an attachment member integrally extending from the other side of the base portion, the knuckles being pivoted together, and each attachment member being of less cross-sectional dimension than the base portion from which it extends, one of the attachment members being embedded in the front and the other attachment member being embedded in the temple.

18. An ophthalmic mounting comprising a non-metal member having a farce provided with a recess provided with a substantially flat bottom and walls, and a hinge member having a base portion provided with oppositely disposed substantially flat sides and walls connecting the sides, one of the flat sides being in contact with the bottom and the walls of the base portion being in contact with the recess walls, the said one flat side being provided with an attachment member embedded in the non-metal material, the other side of the base portion being substantially flush with the said face and having a hinge knuckle projecting therefrom.

19. The combination, in an ophthalmic mounting, with a non-metallic lens frame formed with an extension at one side provided with a beveled portion, and a temple of non-metallic material having a beveled portion, of a hinge connection between the temple and the extension embodying two plates, one cooperating with the rear face of the extension and the other cooperating with the inner face of the temple, an ear extending from each plate, the ears being pivotally connected together, and projections extending from each plate, the projections on one plate being anchored in the extension and the projections on the other plate being anchored in the temple.

20. The combination with a member constituted of zylonite having a substantially flat-bottomed recess, of a substantially flat metal plate fitted tightly in the recess and having an inner projecting beveled wing biting into and embedded within the member to prevent relative movement of the member and the plate, and means extending through the plate and into the member for securing the plate to the member.

21. The combination with a member constituted of zylonite having a substantially flat-bottomed recess, of a substantially flat metal plate fitted tightly in the recess having inner wings biting into and embedded within the member, the zylonite being compressed in between the wings, and means extending through the plate and into the member for securing the plate to the member.

22. An ophthalmic mounting comprising a member constituted of zylonite having a recess the bottom of which is substantially flat and the walls of which are blunt, a substantially flat metal plate having blunt walls fitted tightly in the recess, and a single element extending through the plate and the member for securing the plate to the member.

23. An ophthalmic mounting comprising a member constituted of plastic material having a recess, a plate seated within the recess having wings biting into and embedded within the member, and means extending through the plate and into the member for securing the plate to the member.

24. A hinge plate having oppositely disposed sides, a beveled wing offset from one of the sides adapted to bite into and be embedded within zylonite, and a hinge knuckle projecting from the other side.

25. A hinge plate having two walls connected by a third wall, and a continuous beveled offset flange along the walls adapted to bite into and become embedded within an article.

26. A hinge comprising two plates each having two walls connected by a third wall, and each having a continuous beveled offset flange along the walls adapted to bite into and become embedded within an article, the material of the article being adapted to become compressed within the channel formed by the flange.

27. The combination with a member constituted of plastic material having a flat-bottomed recess with blunt walls, of a hinge plate fitted tightly in the recess and lying flat against the flat bottom wall of the recess with the sides of the plate in contact with the blunt walls, the plate having oppositely disposed, beveled, offset wings biting into and embedded within the member, the material of the member being compressed within the channel between the oppositely disposed wings.

In testimony whereof, we have hereunto subscribed our names.

FREDERICK A. STEVENS.
JAMES W. WELSH.

Certificate of Correction.

It is hereby certified that in Letters Patent No. 1,576,869, granted March 16, 1926, upon the application of Frederick A. Stevens and James W. Welsh, of Providence, Rhode Island, for an improvement in "Ophthalmic Mountings," errors appear in the printed specification requiring correction as follows: Page 1, line 18, for " Serial No. 447,146 " read *Serial No. 477,146;* page 2, line 30, for the word " provided " read *providing;* page 4, line 106, claim 13, after the word " and " insert the article *a;* page 5, line 43, claim 18, for the word " farce " read *face;* and that the said Letters Patent should be read with these corrections therein that the same may conform to the record of the case in the Patent Office.

Signed and sealed this 22d day of June, A. D. 1926.

[SEAL.]

M. J. MOORE,
*Acting Commissioner of Patents.*